US008730486B2

(12) United States Patent
Sano

(10) Patent No.: US 8,730,486 B2
(45) Date of Patent: May 20, 2014

(54) PRINTING APPARATUS, PRINTING METHOD, AND STORAGE MEDIUM

(75) Inventor: Shinji Sano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/342,588

(22) Filed: Jan. 3, 2012

(65) Prior Publication Data

US 2012/0176634 A1 Jul. 12, 2012

(30) Foreign Application Priority Data

Jan. 7, 2011 (JP) ................................ 2011-002165

(51) Int. Cl.
  *H04N 1/60* (2006.01)
  *G06F 15/00* (2006.01)
  *G06K 1/00* (2006.01)
  *G06K 15/00* (2006.01)
  *G06F 3/12* (2006.01)

(52) U.S. Cl.
  USPC .......... 358/1.12; 358/1.15; 358/1.9; 358/1.13

(58) Field of Classification Search
  None
  See application file for complete search history.

(56) References Cited

U.S. PATENT DOCUMENTS

| | | | | |
|---|---|---|---|---|
| 5,107,338 | A * | 4/1992 | Saito | 358/296 |
| 7,268,909 | B2 * | 9/2007 | Nakagiri | 358/1.16 |
| 7,751,074 | B2 * | 7/2010 | Kaneko | 358/1.15 |
| 8,040,535 | B2 * | 10/2011 | Kurahashi et al. | 358/1.12 |
| 8,125,693 | B2 * | 2/2012 | Arai | 358/462 |
| 2003/0161671 | A1 * | 8/2003 | Hokiyama | 400/188 |
| 2005/0190382 | A1 | 9/2005 | Van Os | |
| 2006/0209348 | A1 * | 9/2006 | Tabata | 358/3.28 |
| 2009/0190146 | A1 * | 7/2009 | Xu | 358/1.9 |
| 2009/0244586 | A1 * | 10/2009 | Sei | 358/1.13 |
| 2009/0284767 | A1 * | 11/2009 | Harada | 358/1.9 |
| 2010/0002259 | A1 * | 1/2010 | Maruyama et al. | 358/1.15 |
| 2010/0033743 | A1 * | 2/2010 | Hirai | 358/1.9 |
| 2010/0208262 | A1 | 8/2010 | Yoshida | |
| 2012/0147406 | A1 * | 6/2012 | Yamaneki et al. | 358/1.13 |

FOREIGN PATENT DOCUMENTS

| | | |
|---|---|---|
| CN | 101626441 A | 1/2010 |
| JP | 2000-287024 A | 10/2000 |
| JP | 2002-077606A A | 3/2002 |
| JP | 2004-235680A A | 8/2004 |
| JP | 2010-016770 A | 1/2010 |

* cited by examiner

*Primary Examiner* — Ming Hon

(74) *Attorney, Agent, or Firm* — Canon USA, Inc. IP Division

(57) ABSTRACT

A printing apparatus includes a determination unit configured to determine whether a document read by a reading unit is blank. The printing apparatus controls a printing unit to perform print processing based on image data corresponding to a document that has been determined not to be blank by the determination unit, and controls the printing unit not to perform print processing based on image data corresponding to document that has been determined to be blank by the determination unit. The printing apparatus discharges a sheet, on which print processing has been performed based on image data corresponding to a document, subsequent to the document that has been determined to be blank by the determination unit, which has been determined not to be blank by the determination unit, to be distinguishable from a sheet that has already been discharged.

6 Claims, 15 Drawing Sheets

PRINTING APPARATUS, PRINTING METHOD, AND STORAGE MEDIUM

BACKGROUND OF THE INVENTION

1. Field of the Invention

Embodiments of the present invention relate to a printing apparatus, a printing method, and a storage medium.

2. Description of the Related Art

A printing apparatus conveying a plurality of documents set in an automatic document conveyance apparatus, reading an image on a document, and printing the read image on a recording medium has conventionally been known.

If a document includes a blank page, when the image read from the blank page is printed, the printing is useless. In order to prevent that, a technique for automatically deleting the image read from the blank page included in a document has been known, as discussed in Japanese Patent Application Laid-Open No. 2000-287024 and Japanese Patent Application Laid-Open No. 2010-16770.

In the technique for automatically deleting the image read from the blank page, a result of determination whether the document is a blank page may sometimes be unintended result of a user of the printing apparatus. For example, a document on which an image has been partially printed may be determined as a blank page, and the document may not be printed. Alternatively, a document that is to be determined as a blank page may not be determined as a blank page, and the document may be printed.

In such a case, the user of the printing apparatus is required to give an instruction to print the page that has not been printed, or to remove a sheet corresponding to the blank page that has been printed. However, Japanese Patent Application Laid-Open No. 2000-287024 and Japanese Patent Application Laid-Open No. 2010-16770 discuss determining whether a document is a blank page while not discussing a method for dealing with a case where a determination result that is not intended by a user of a printing apparatus is obtained.

Therefore, with a technique discussed in Japanese Patent Application Laid-Open No. 2000-287024 and Japanese Patent Application Laid-Open No. 2010-16770, when a user issues an instruction to print a page that has been determined to be a blank page against the user's intention and inserts a sheet, on which the page has been newly printed, between sheets on which printing has already been performed, it is difficult to find out an appropriate insertion position. When a sheet, on which an image on a page that has been determined not to be a blank page has been printed, is removed from the sheets on which printing has already been performed, it is difficult to find out the appropriate sheet.

SUMMARY OF THE INVENTION

One disclosed aspect of the embodiments is directed to a printing apparatus, and a printing method capable of easily inserting a sheet, on which printing is newly performed, between sheets on which printing have already been performed when a result of determination whether a page is a blank page is an unintended result by a user of the printing apparatus.

According to an aspect of the embodiments, a printing apparatus includes a reading unit configured to read a document to generate image data, a printing unit configured to perform print processing on a sheet based on the image data, a determination unit configured to determine whether the document read by the reading unit is blank, a control unit configured to control the printing unit to perform the print processing based on image data corresponding to the document that has been determined not to be blank by the determination unit, and control the printing unit not to perform the print processing based on image data corresponding to the document that has been determined to be blank by the determination unit, and a sheet discharge unit configured to discharge a sheet, on which the print processing has been performed based on the image data corresponding to the document, subsequent to the document that has been determined to be blank by the determination unit, which has been determined not to be blank by the determination unit, to be distinguishable from a sheet that has already been discharged.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
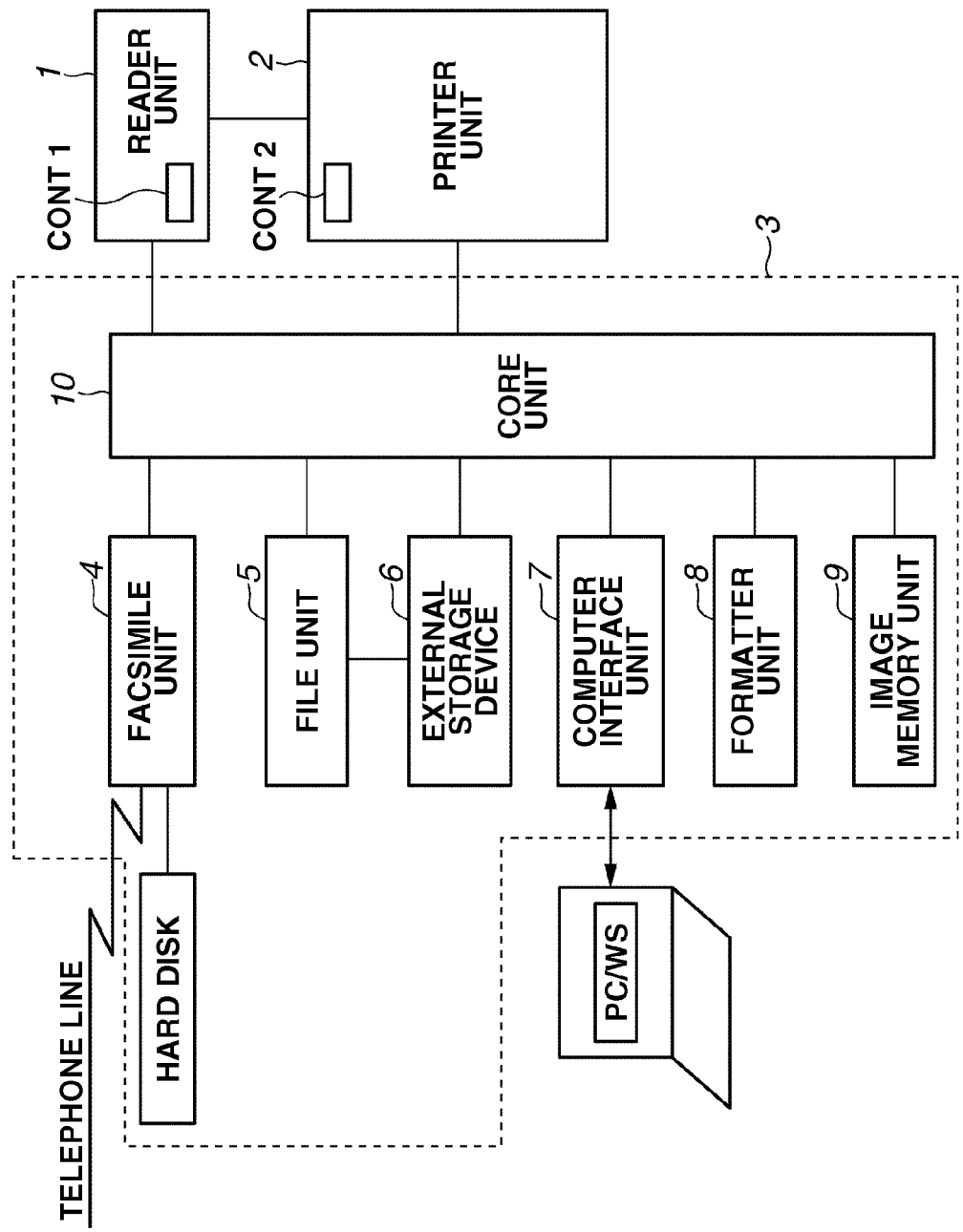
FIG. 1 is a block diagram illustrating a configuration of a printing apparatus.

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

The same constituent elements are assigned the same reference numerals, and hence description thereof is not repeated. A constituent block required for the present exemplary embodiment will be first described, and details of processing will be then described.

FIG. 1 is a block diagram illustrating a configuration of a printing apparatus according to a first exemplary embodiment. In FIG. 1, a reader unit 1 (a reading unit) has a function of reading a plurality of documents, and converting the read documents into image data. A printer unit 2 (a printing unit) has a function of printing images on sheets based on the image data corresponding to the plurality of pages input by the reader unit 1.

A control unit 3 is electrically connected to the reader unit 1, and has various functions. The control unit 3 includes a facsimile unit 4, a file unit 5, an external storage device 6 connected to the file unit 5, and a computer interface unit 7 to be connected to a computer and a local area network (LAN).

The control unit 3 includes a formatter unit 8 for converting print data input via the computer interface unit 7 into image data printable by the printer unit 2. The control unit 3 includes an image memory unit 9 for temporarily storing the image data input by the reader unit 1 and the print data input via the computer interface unit 7. The control unit 3 includes a core unit 10 for controlling each of the units provided in the control unit 3.

A CONT 1 12 functions as a control unit 12 for controlling the reader unit 1, and a CONT 2 14 functions as a control unit 14 for controlling the printer unit 2. The CONT 1 12 and the CONT 2 14 are configured to be able to communicate with the core unit 10 in the control unit 3. Each of the CONT 1 12 and the CONT 2 14 includes a central processing unit (CPU), a read-only memory (ROM), and a random access memory (RAM). While the printer unit 2 is connected to the control unit 3 via the reader unit 1 in FIG. 1, another form may be used. For example, the printer unit 2 may be directly connected to the control unit 3 (shown as a dashed double arrow).

Figure 2:
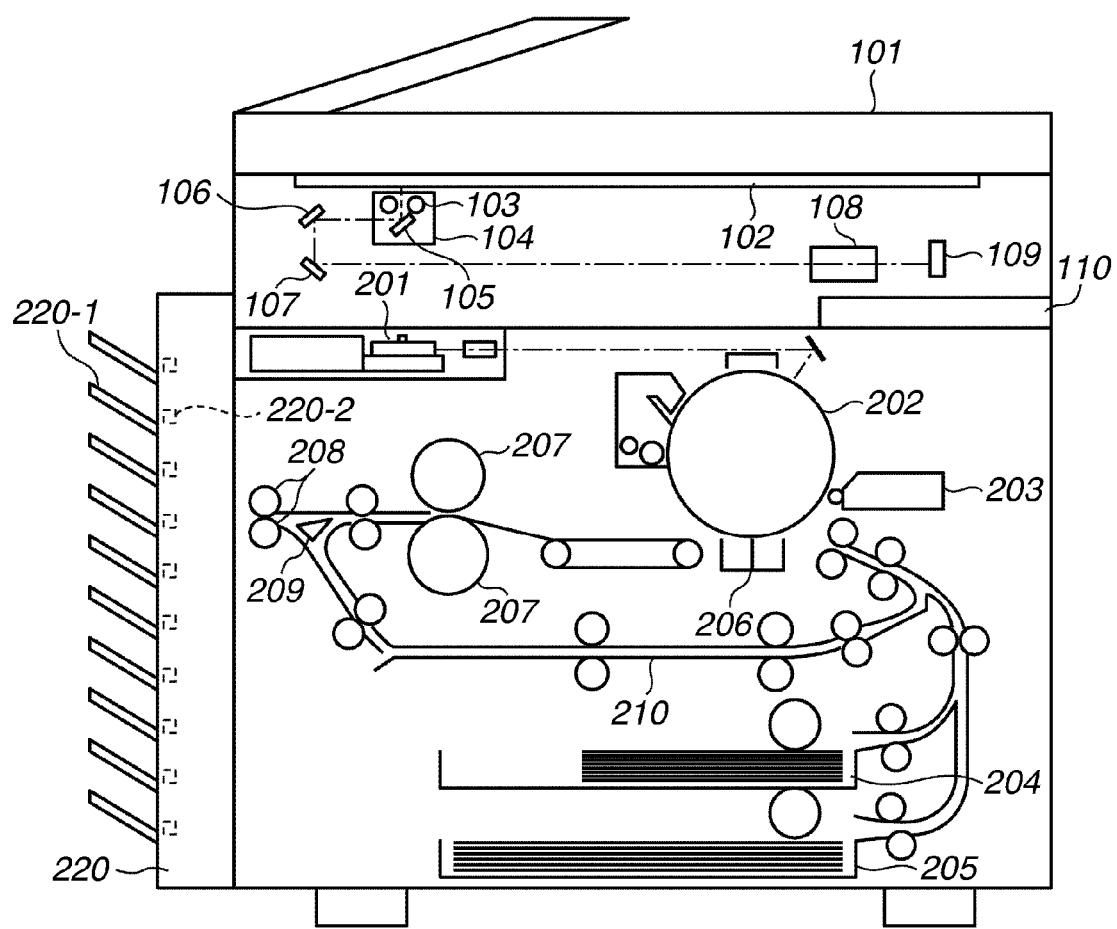
FIG. 2 is a sectional view illustrating the configuration of the printing apparatus.

FIG. 2 is a sectional view illustrating a configuration of the printing apparatus including the reader unit 1 and the printer unit 2 illustrated in FIG. 1. The configuration and the operation of the printing apparatus will be described below.

A document feeder 101 sequentially conveys documents stacked on the document feeder 101 one by one onto a document positioning glass plate 102. When the document is conveyed to a predetermined position of the glass plate 102, a lamp 103 in a scanner unit 104 lights up, and the scanner unit 104 moves, to irradiate the document. Light reflected by the document is input onto a charge coupled device (CCD) image sensor (hereinafter referred to as a CCD) 109 via mirrors 105, 106, and 107 and a lens 108.

An image processing unit 110 provided in the core unit 10 illustrated in FIG. 1 subjects image data input by the CCD 109 to image processing. The image data, which is subjected to the image processing by the image processing unit 110, is stored in the image memory unit 9 illustrated in FIG. 1. The image data, which has been subjected to the image processing, is stored in the image memory unit 9 again. Image processing performed by the image processing unit 110 may include determining if the image data correspond to a blank sheet, rotation processing for rotating the image data, etc.

The core unit 10 may send the image data stored in the image memory unit 9 to the printer unit 2, and the printer unit 2 may perform print processing. The image data sent to the printer unit 2 is converted into a light signal that has been modulated by an exposure control unit 201, and a photosensitive member 202 is irradiated with the light signal. A development unit 203 develops a latent image formed on the photosensitive member 202 with irradiation light.

A sheet stacking unit 204 or a sheet stacking unit 205 conveys a sheet at the same timing as that of a leading edge of the latent image, and a transfer unit 206 transfers the latent image onto the conveyed sheet.

After a fixing unit 207 fixes the transferred image on the sheet, a sheet discharge unit 208 discharges the sheet to each of sheet discharge bins 220-1 (sheet discharge units) in a sorter 220. In the case, if the core unit 10 designates the sheet discharge bin 220-1, the sorter 220 is controlled so that the sheet is discharged to the designated discharge bin 220-1.

The sorter 220 includes sheet detection sensors 220-2 respectively corresponding to the sheet discharge bins 220-1, and may detect whether the sheet is discharged to each of the discharge bins 220-1. The sorter 220 is configured to count for each of the sheet discharge bins 220-1 the number of sheets discharged to the discharge bin 220-1. The count value is reset to zero in response to detection that the sheet detection sensor 220-2 changes from the presence of the sheet to the absence of the sheet. The sorter 220 is configured to also store for each of the sheet discharge bins 220-1 the size of the sheet discharged to each discharge bin 220-1.

When the sheet is discharged to the sheet discharge bin 220-1 from the sheet discharge unit 208, a reversing mechanism (not illustrated) reverses the sheet so that its surface, which has been subjected to print processing, is directed downward. The reversing mechanism thus reverses the sheet so that a plurality of sheets may be discharged to the sheet discharge bin 220-1 in the order in which the document feeder 101 reads the documents.

Figure 3:
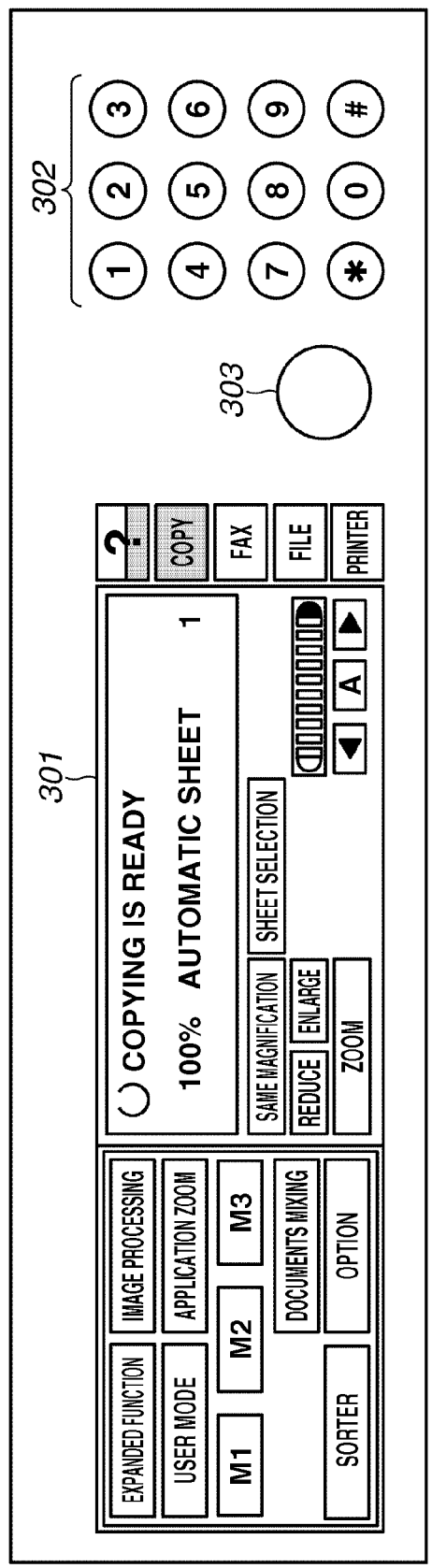
FIG. 3 is a plan view illustrating an example of an operation panel.

FIG. 3 is a plan view illustrating an example of an operation panel provided in the reader unit 1 illustrated in FIG. 1.

In FIG. 3, a display unit 301 displays an operation status of the printing apparatus and a message to an operator of the printing apparatus. A surface of the display unit 301 is a touch panel, and functions as a selection key by touching the surface. A numeric keypad 302 may be used to input numeric characters. A start key 303 may be pressed so as to start the document feeder 101 to convey the documents.

Figure 4:
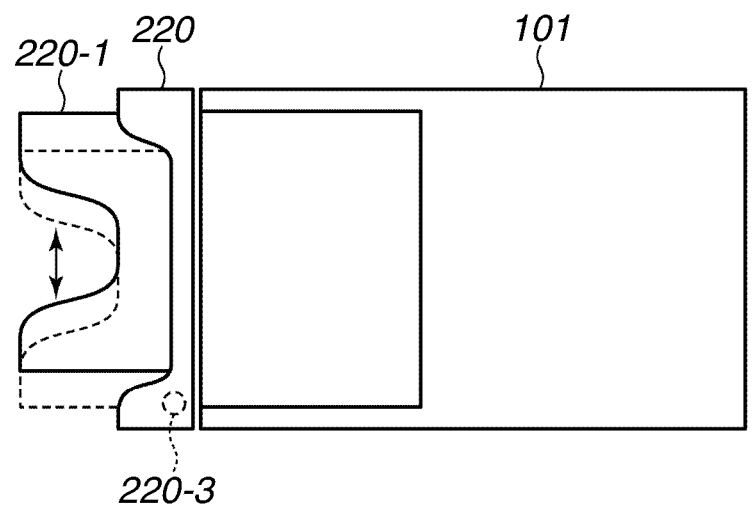
FIG. 4 illustrates each discharge bin 220-1 in a sorter 220 illustrated in FIG. 2 as viewed from above the printing apparatus.

FIG. 4 illustrates each of the sheet discharge bins 220-1 in the sorter 220 illustrated in FIG. 2 as viewed from above the printing apparatus. The discharge bins 220-1 illustrated in FIG. 2 each have the same structure.

In FIG. 4, the CONT 2 14 controls a motor 220-3 so that a position of the sheet discharge bin 220-1 may be moved to either a position indicated by a solid line or a position indicated by a broken line in FIG. 4. Since a position where a sheet, on which the printer unit 2 has performed print processing, is discharged to the discharge bin 220-1 is fixed, the position of the discharge bin 220-1 is moved so that a sheet to be newly discharged is discharged to the discharge bin 220-1 in the state of being shifted by a predetermined amount from the sheet that has already been discharged. Thus, the sheet that has already been discharged and the sheet to be newly discharged are distinguishable.

Processing performed by the printing apparatus according to the first exemplary embodiment will be described below with reference to a flowchart illustrated in FIG. 5.

Figure 5:
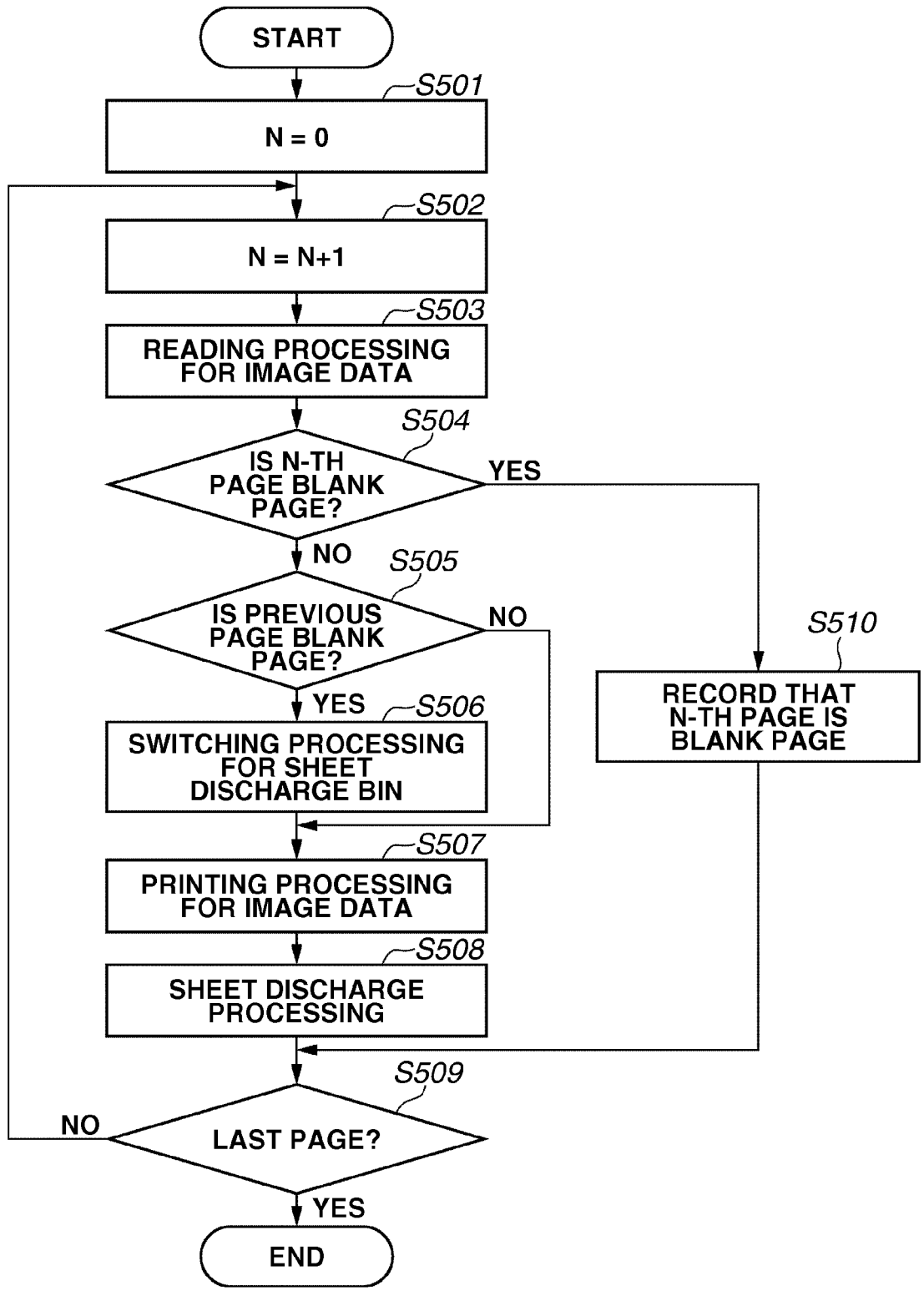
FIG. 5 is a flowchart illustrating processes performed by the printing apparatus.

FIG. 5 is a flowchart illustrating the processing performed by the printing apparatus. Each of operations in the flowchart illustrated in FIG. 5 is performed when the CPU provided in the core unit 10 executes a program. The core unit 10 controls the CONT 1 12 in the reader unit 1 and the CONT 2 14 in the printer unit 2, to perform each of the operations.

In operation S501, the core unit 10 initializes a variable N for counting the number of documents read by the document feeder 101 as zero. In operation S502, the core unit 10 increments or adds "1" to the variable N.

In operation S503, the core unit 10 performs reading processing by using the CCD 109 to read the document conveyed by the document feeder 101 as image data.

In operation S504, the core unit 10 controls the image processing unit 110 to subject the image data read by the CCD 109 to image processing. The image data, which has been subjected to the image processing by the image processing unit 110, is stored in the image memory unit 9.

Contents of the image processing performed by the image processing unit 110 include image processing for determining whether the image data read by the CCD 109 corresponds to a blank page, among various types of image processing. In this context, the image processing unit 110 may be referred to as a determination unit. More specifically, in operation S504, the core unit 10 causes the image processing unit 110 to determine whether the N-th page is a blank page. Various methods are applicable as a method for determining whether the N-th page is a blank page.

If each of pixels composing the image data is read by a binary white or black pixel value, for example, a method for determining, when the number of pixels included in one page is a predetermined number of pixels or less (e.g., 10 pixels or less), that the page is blank.

If the image processing unit 110 determines that the N-th page is a blank page (YES in operation S504), the processing proceeds to operation S510. In operation S510, the core unit 10 stores information indicating that image data corresponding to the N-th page is blank data in the RAM provided therein. The core unit 10 performs control on the printer unit 2 not to print the image data that has been determined to correspond to a blank page.

If the image processing unit 110 determines that the N-th page is not a blank page (NO in operation S504), the processing proceeds to operation S505. In operation S505, the core unit 10 determines whether the previous page ((N-1)-th page) is a page that has been determined to be the blank page in operation S504.

If it is determined that the (N-1)-th page is the blank page (YES in operation S505), the processing proceeds to operation S506. In operation S506, the core unit 10 notifies the CONT 2 14 in the printer unit 2 that processing for switching the sheet discharge bin 220-1 is performed.

The CONT 2 14 in the printer unit 2 controls, when notified of the processing for switching the sheet discharge bins 220-1, the sorter 220 to switch the discharge bin 220-1, to which the sheet, on which the image data corresponding to the N-th page has been printed, is discharged. If it is determined that the (N-1)-th page is not the blank page (NO in operation S505), the processing proceeds to operation S507. The core unit 10 does not perform the processing for switching the sheet discharge bin 220-1.

In operation S507, the core unit 10 sends the image data stored in the image memory unit 9 to the printer unit 2, and the CONT 2 14 in the printer unit 2 performs printing of the image data. In operation S508, the CONT 2 14 controls the sorter 220, to perform sheet discharge processing for discharging the sheet, on which the printer unit 2 has performed print processing, to the sheet discharge bin 220-1.

In operation S509, the core unit 10 continuously confirms the presence or absence of a document to be read by the document feeder 101. If there is no document to be read, e.g., the page is the last page (YES in operation S509), the core unit 10 determines that the last page has been reached, and the processes illustrated in FIG. 5 end. On the other hand, if there is a document to be read (NO in operation S509), the core unit 10 determines that the last page has not been reached, and the processes in operation S502 and the subsequent operations are performed again.

While a case where image data, corresponding to one page, is read (S503), the image data is printed (S507), a sheet, on which print processing has been performed, is discharged (step S508), and processing for the subsequent page is started has been described, another form may be used.

For example, the operations in the flowchart illustrated in FIG. 5 may be concurrently performed for each of the image data corresponding to the plurality of pages. The operations in the flowchart illustrated in FIG. 5 are performed for each of the image data corresponding to the plurality of pages so that the printing apparatus may continuously perform the processing for reading the image data corresponding to the plurality of pages and the processing for printing the image data corresponding to the plurality of pages.

A processing result of the printing apparatus in the flowchart illustrated in FIG. 5 will be described with reference to FIGS. 6 and 7. For example, a case where twelve documents including blank pages (a fifth page and a tenth page) are stacked on the document feeder 101, to perform the processes illustrated in FIG. 5 will be described with reference to FIG. 6.

Figure 6:
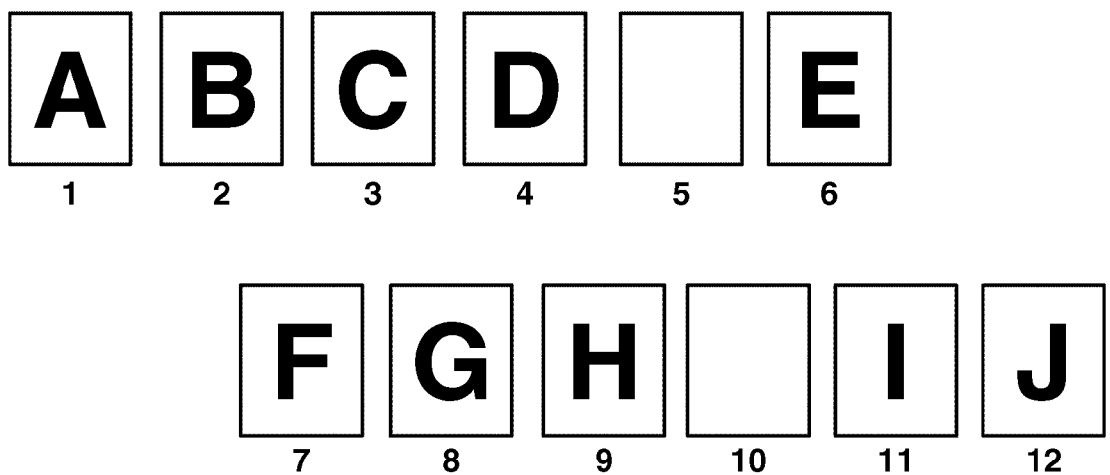
FIG. 6 illustrates an example of documents read by a document feeder 101.

In an example illustrated in FIG. 6, it is determined that first to fourth pages, sixth to ninth pages, and eleventh and twelfth pages are not blank pages. On the other hand, it is recognized that the fifth page and the 10th page are blank pages. In operation S510 illustrated in FIG. 5, the information that the fifth and tenth pages are blank pages is stored in the RAM in the core unit 10.

In the example illustrated in FIG. 6, the image processing unit 110 determines that the fifth page and the 10th page are blank pages in operation S504. The core unit 10 determines that the previous pages are blank pages in operation S505 during processing for the sixth page and the 11th page. Therefore, the processing for switching the sheet discharge bin 220-1 is performed during the processing for the sixth and 11th pages.

Figure 7:
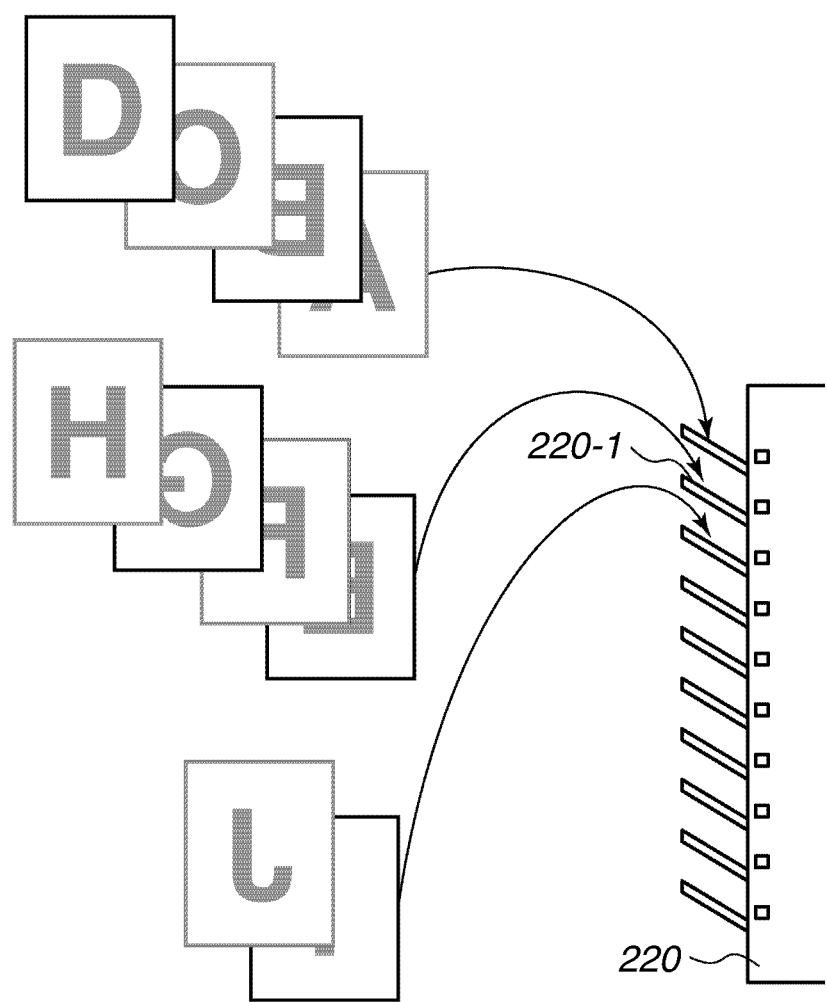
FIG. 7 illustrates a sheet discharge result of sheets to sheet discharge bin 220-1.

If the document feeder 101 reads the documents illustrated in FIG. 6 and the processes in the flowchart illustrated in FIG. 5 are performed, a sheet discharge result of sheets to the sheet discharge bins 220-1 is as illustrated in FIG. 7. In FIG. 7, sheets, on which pages A, B, C, and D have been printed in this order, are discharged onto the uppermost one of the sheet discharge bins 220-1 with their print surfaces directed downward.

In FIG. 7, sheets, on which pages E, F, G, and H have been printed in this order, are discharged to the second sheet discharge bin 220-1 from above with their print surfaces directed downward, and sheets, on which pages I and J have been printed in this order, are discharged to the third sheet discharge bin 220-1 from above with their print surfaces directed downward.

More specifically, the sheets corresponding to the first page to the fourth page (A, B, C, and D) are discharged to the uppermost sheet discharge bin 220-1, and the sheets corresponding to the sixth page to the ninth page (E, F, G, and H) are discharged to the second sheet discharge bin 220-1 from above, as illustrated in FIG. 6.

The sheets corresponding to the 11th page and the 12th page (I and J) are discharged to the third sheet discharge bin 220-1 from above. Thus, the sheet, on which an image has been printed based on image data corresponding to the page, subsequent to the page that has been determined to be blank, which has not been determined to be blank, is discharged to be distinguishable from the sheet that has already been discharged.

As described above, according to the first exemplary embodiment, the printing apparatus switches the sheet discharge bin 220-1 when discharging the sheet, on which the page subsequent to the page that has been determined to be blank has been printed, to the sheet discharge bin 220-1.

Thus, the operator of the printing apparatus may easily recognize the page that has been determined to be blank. When the page that has been determined to be blank is printed and is inserted between the sheets that have already been discharged (printed), for example, therefore, the operator may easily recognize a position into which the sheet is to be inserted.

A second exemplary embodiment of the present invention will be described below. The second exemplary embodiment is a modified example of the first exemplary embodiment, and only a difference from the first exemplary embodiment will be described below. Portions that are not particularly described are similar to those described in the first exemplary embodiment.

In the first exemplary embodiment, the sheet discharge bin 220-1 is switched when the sheet, on which the page subsequent to the page that has been determined not to be blank has been printed, is discharged to the sheet discharge bin 220-1.

On the other hand, in the second exemplary embodiment, a sheet discharge bin 220-1 is not switched but is controlled so that the longitudinal direction of a sheet differs from that of a sheet that has already been discharged.

Processing performed by a printing apparatus according to the second exemplary embodiment will be described with reference to a flowchart illustrated in FIG. 8.

Figure 8:
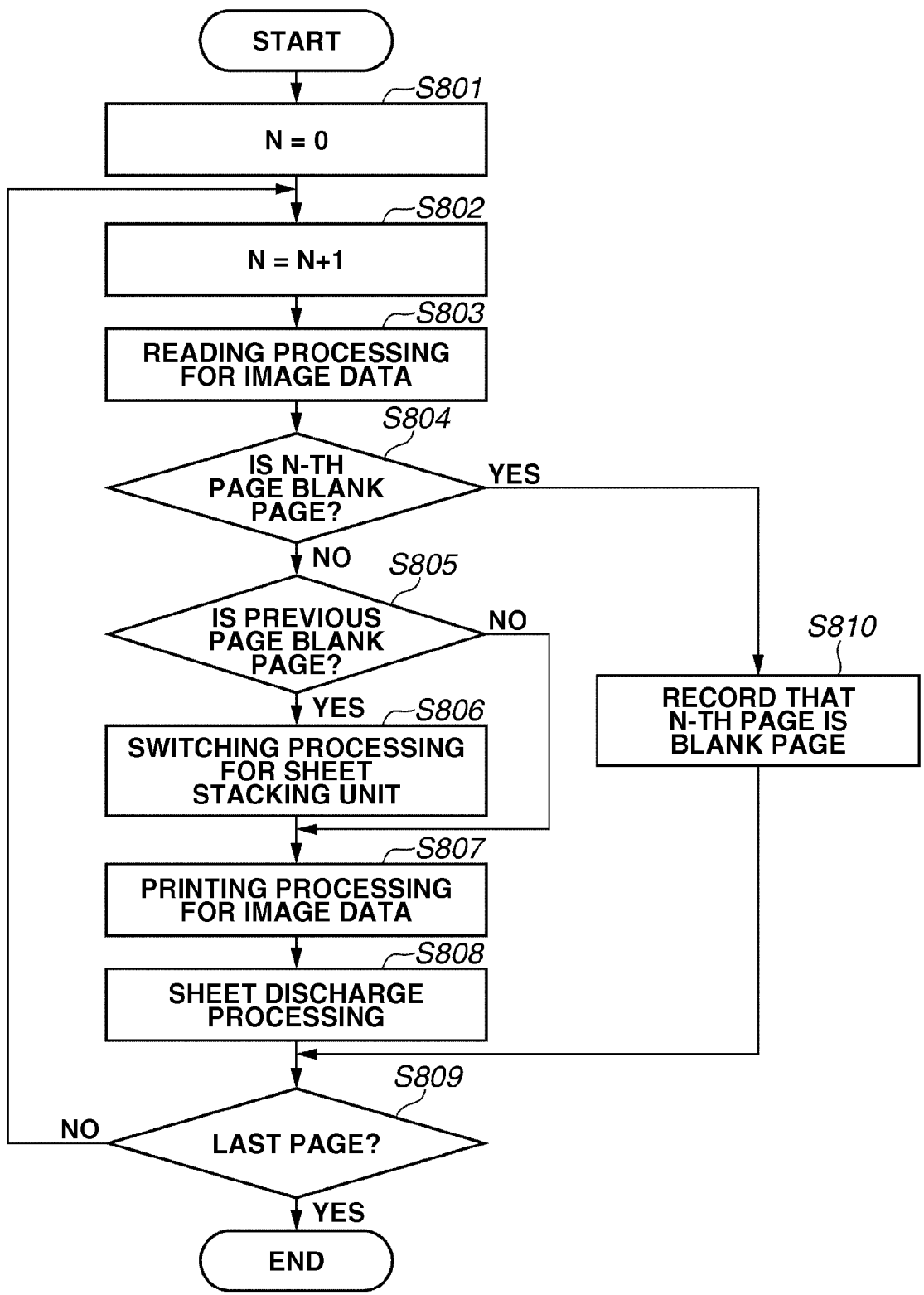
FIG. 8 is a flowchart illustrating processes performed by the printing apparatus.

FIG. 8 is a flowchart illustrating processing performed by the printing apparatus. Each of operations in the flowchart illustrated in FIG. 8 is performed when a CPU provided in the core unit 10 executes a program. The core unit 10 controls the CONT 1 12 in the reader unit 1 and the CONT 2 14 in the printer unit 2, to perform each of the processes.

The flowchart illustrated in FIG. 8 is a modified example of the flowchart illustrated in FIG. 5 according to the first exemplary embodiment. Operations S801 to S805 and operations S807 to S810 in the flowchart illustrated in FIG. 8 are similar to operations S501 to S505 and operations S507 to S510 in the flowchart illustrated in FIG. 5, and hence description thereof is not repeated.

The process in operation S806 illustrated in FIG. 8 differs from the process in operation S506 illustrated in FIG. 5, and hence operation S806 will be described below.

Figure 10:
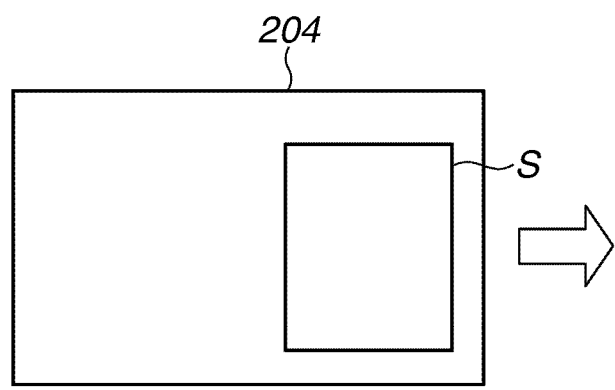
FIG. 10 illustrates a sheet stacked on a sheet stacking unit 204.

In the second exemplary embodiment, a sheet of A4 size the longitudinal direction of which differs from a sheet conveyance direction (indicated by an arrow), as illustrated in FIG. 10, is stacked on a sheet stacking unit 204. A sheet of A4 size the longitudinal direction of which is the same as a sheet conveyance direction (indicated by an arrow), as illustrated in FIG. 11, is stacked on a sheet stacking unit 205.

Figure 11:
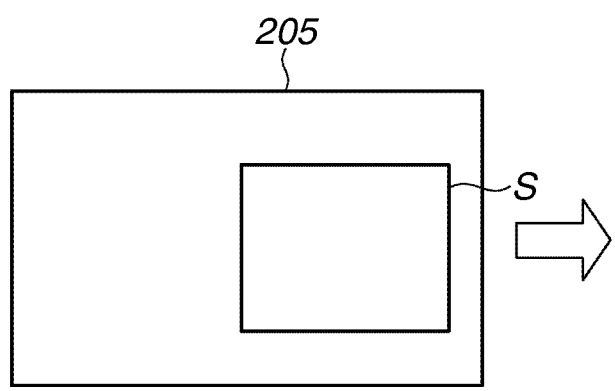
FIG. 11 illustrates a sheet stacked on a sheet stacking unit 205.

FIGS. 10 and 11 illustrate the sheet stacking units 204 and 205 illustrated in FIG. 2 as viewed from the top of the printing apparatus.

In FIG. 8, if the image processing unit 110 determines that the N-th page is not a blank page (NO in operation S804), the processing proceeds to operation S805. In operation S805, the image processing unit 110 determines whether the previous page (the (N-1)-th page) is a blank page in operation S804. If the previous page is the blank page (YES in operation S804), the processing proceeds to operation S806. In operation S806, the core unit 10 notifies the CONT 2 14 in the printer unit 2 that processing for switching the sheet stacking unit 220-1 is to be performed.

The processing for switching the sheet stacking unit 220-1 means processing for switching whether to use the sheet stacked on the sheet stacking unit 204 or the sheet stacked on the sheet stacking unit 205 as a sheet to be used when image data is printed in operation S807.

The sheet stacked on the sheet stacking unit 204 is the sheet of A4 size the longitudinal direction of which differs from the sheet conveyance direction, as described above. The sheet stacked on the sheet stacking unit 205 is the sheet of A4 size the longitudinal direction of which is the same as the sheet conveyance direction, as described above.

If the sheet to be used for the print processing is fed from the sheet stacking unit 204 before the process in operation S806 is performed, for example, the process in operation S806 is performed. Thus, switching processing from the sheet stacking unit 204 to the sheet stacking unit 205 is performed, and the sheet, on which print processing is to be performed after that, is fed from the sheet stacking unit 205.

A processing result of the printing apparatus in the flowchart illustrated in FIG. 8 will be described with reference to FIGS. 6 and 9.

A case where twelve documents including blank pages (a fifth page and a tenth page) are stacked on a document feeder 101, to perform processes illustrated in FIG. 8, for example, will be described with reference to FIG. 6.

In an example illustrated in FIG. 6, it is determined that first to fourth pages, sixth to ninth pages, and eleventh and twelfth pages are not blank pages. On the other hand, it is recognized that the fifth page and the tenth page are blank pages. In operation S810 illustrated in FIG. 8, a RAM in the core unit 10 stores information that the fifth and 10th pages are blank pages.

In the example illustrated in FIG. 6, the image processing unit 110 determines that the fifth page and the 10th page are blank pages in operation 804. The core unit 10 determines that the previous pages are blank pages in operation S805 during processing for the sixth page and the 11th page. Therefore, the processing for switching the sheet stacking unit 220-1 is performed during the processing for the sixth and 11th pages.

Figure 9:
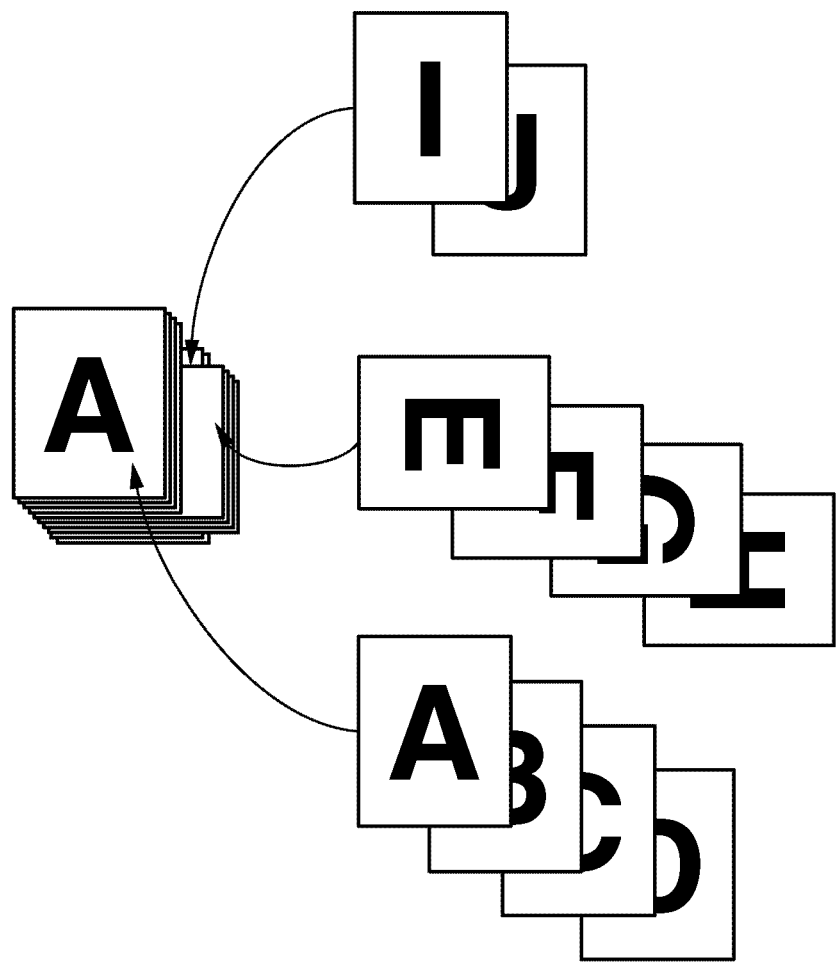
FIG. 9 illustrates a sheet discharge result of sheets to the sheet discharge bin 220-1.

If the document feeder 101 reads the documents illustrated in FIG. 6, to perform the processes in the flowchart illustrated in FIG. 8, a sheet discharge result of sheets to sheet discharge bin 220-1 is as illustrated in FIG. 9. In FIG. 9, sheets, on which pages A, B, C, D, E, F, G, H, I, and J have been printed in this order, are discharged to the uppermost one of the sheet discharge bins 220-1 with their print surfaces directed downward.

More specifically, the first to fourth pages (A, B, C, and D) and the 11th and 12th pages (I and J) illustrated in FIG. 6 are printed on the sheets of A4 size the longitudinal direction of which differs from the sheet conveyance direction. The sixth to ninth pages (E, F, G, and H) are printed on the sheets of A4 size the longitudinal direction of which is the same as the sheet conveyance direction.

Thus, the sheet, on which an image has been printed based on image data corresponding to a page, subsequent to the page that has been determined to be blank, which has been determined not to be blank, is discharged to be distinguishable from the sheet that has already been discharged.

As described above, according to the second exemplary embodiment, the printing apparatus makes the longitudinal direction of the sheet, on which the page subsequent to the page that has been determined to be blank has been printed, different from the longitudinal direction of the sheet that has already been discharged.

Thus, the operator of the printing apparatus may easily recognize the page that has been determined to be blank. When the page that has been determined to be blank is printed and is inserted between the sheets that have already been discharged (printed), for example, therefore, the operator may easily recognize a position into which the sheet is to be inserted.

A third exemplary embodiment of the present invention will be described below. The third exemplary embodiment is a modified example of the first exemplary embodiment, and only a difference from the first exemplary embodiment will be described below. Portions that are not particularly described are similar to those described in the first exemplary embodiment.

In the first exemplary embodiment, the sheet discharge bin 220-1 is switched when the sheet, on which the page subsequent to the page that has been determined not to be a blank page has been printed, is discharged to the sheet discharge bin 220-1.

On the other hand, in the third exemplary embodiment, a sheet discharge bin 220-1 is not switched but is controlled to shift a sheet by a predetermined amount from a sheet that has already been discharged.

Processing performed by a printing apparatus according to the third exemplary embodiment will be described with reference to a flowchart illustrated in FIG. 12.

Figure 12:
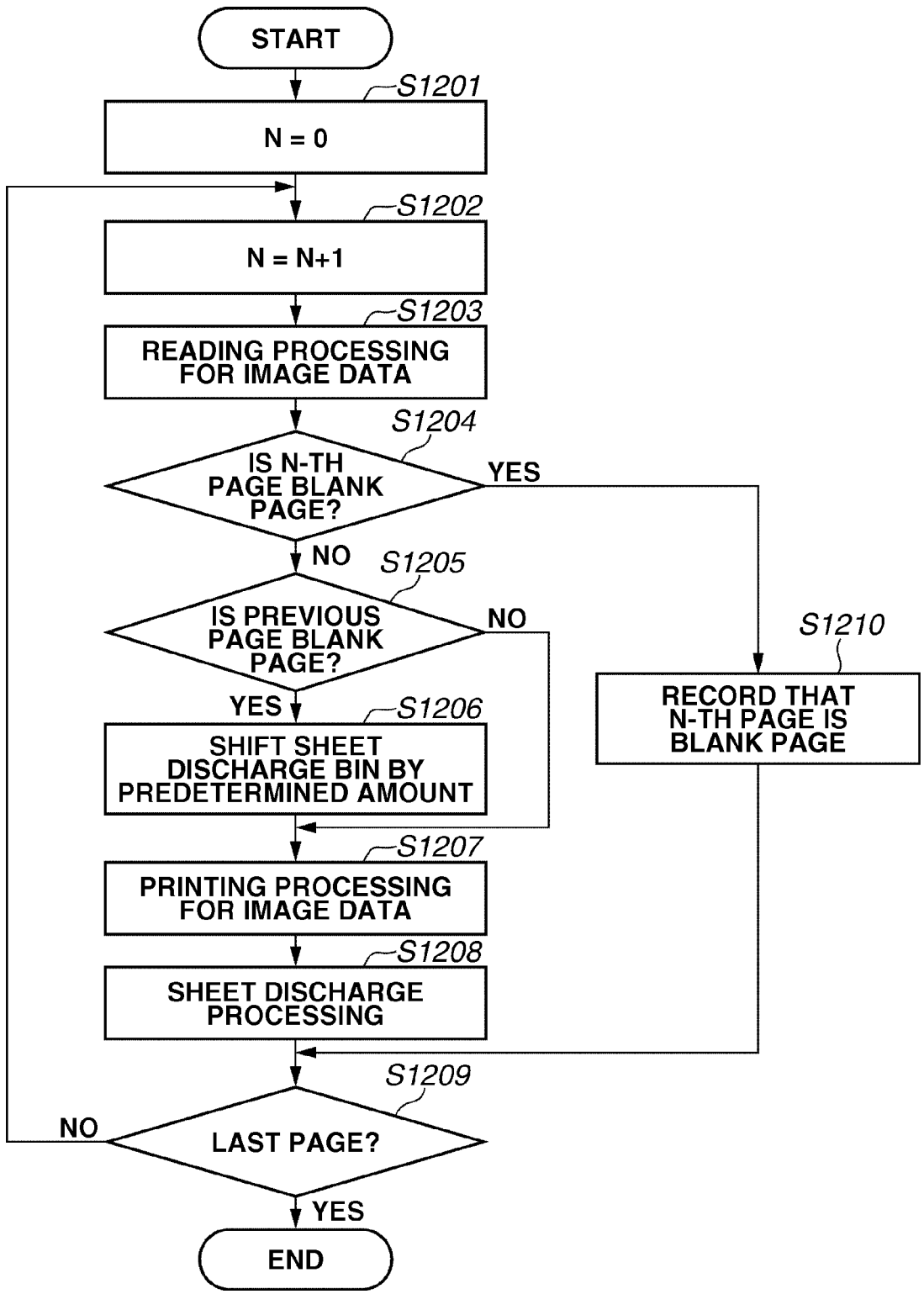
FIG. 12 is a flowchart illustrating processes performed by the printing apparatus.

FIG. 12 is a flowchart illustrating processing performed by the printing apparatus. Each of operations in the flowchart illustrated in FIG. 12 is performed when a CPU provided in the core unit 10 executes a program. The core unit 10 controls the CONT 1 12 in the reader unit 1 and the CONT 2 14 in the printer unit 2, to perform each of the operations.

The flowchart illustrated in FIG. 12 is a modified example of the flowchart illustrated in FIG. 5 according to the first exemplary embodiment. Operations S1201 to S1205 and operations S1207 to S1210 in the flowchart illustrated in FIG. 12 are similar to operations S501 to S505 and operations S507 to S510 in the flowchart illustrated in FIG. 5, and hence description thereof is not repeated.

The process in operation S1206 illustrated in FIG. 12 differs from the process in operation S506 illustrated in FIG. 5, and hence operation S1206 will be described below.

If an image processing unit 110 determines that the N-th page is not a blank page (NO in operation S1204), the processing proceeds to operation S1205. In operation S1205, the core unit 10 determines whether the previous page ((N-1)-th page) is a blank page in operation S1204.

If the previous page is the blank page (YES in operation S1205), the processing proceeds to operation S1206. In operation S1206, the core unit 10 notifies the CONT 2 14 in the printer unit 2 that the sheet discharge bin 220-1 is shifted by a predetermined amount. Processing for shifting the sheet discharge bin 220-1 by a predetermined amount means processing for the printer 2 to switch a position of the sheet discharge bin 220-1 between a position indicated by a solid line and a position indicated by a broken line in FIG. 4.

Since a position where the sheet, on which the printer unit 2 has performed print processing, is discharged to the discharge bin 220-1 is fixed, the position of the discharge bin 220-1 is moved so that a sheet to be newly discharged is discharged in the state of being shifted by a predetermined amount from a sheet that has already been discharged to the discharge bin 220-1. Thus, the sheet that has already been discharged and the sheet to be newly discharged are distinguishable.

A processing result of the printing apparatus in the flowchart illustrated in FIG. 12 will be described with reference to FIGS. 6 and 13.

A case where twelve documents including blank pages (a fifth page and a tenth page) are stacked on a document feeder 101, to perform processes illustrated in FIG. 12, for example, will be described with reference to FIG. 6.

In an example illustrated in FIG. 6, it is determined that first to fourth pages, sixth to ninth pages, and eleventh and twelfth pages are not blank pages. On the other hand, it is recognized that the fifth page and the tenth page are blank pages. In operation S1210 illustrated in FIG. 12, a RAM in the core unit 10 stores information that the fifth and tenth pages are blank pages.

In the example illustrated in FIG. 6, the image processing unit 110 determines that the fifth and tenth pages are blank pages in operation S1204. The core unit 10 determines that the previous pages are blank pages in operation S1205 during processing for the sixth page and the eleventh page. Therefore, processing for shifting the sheet discharge bin 220-1 by a predetermined amount is performed during the processing for the sixth and 11th pages.

Figure 13:
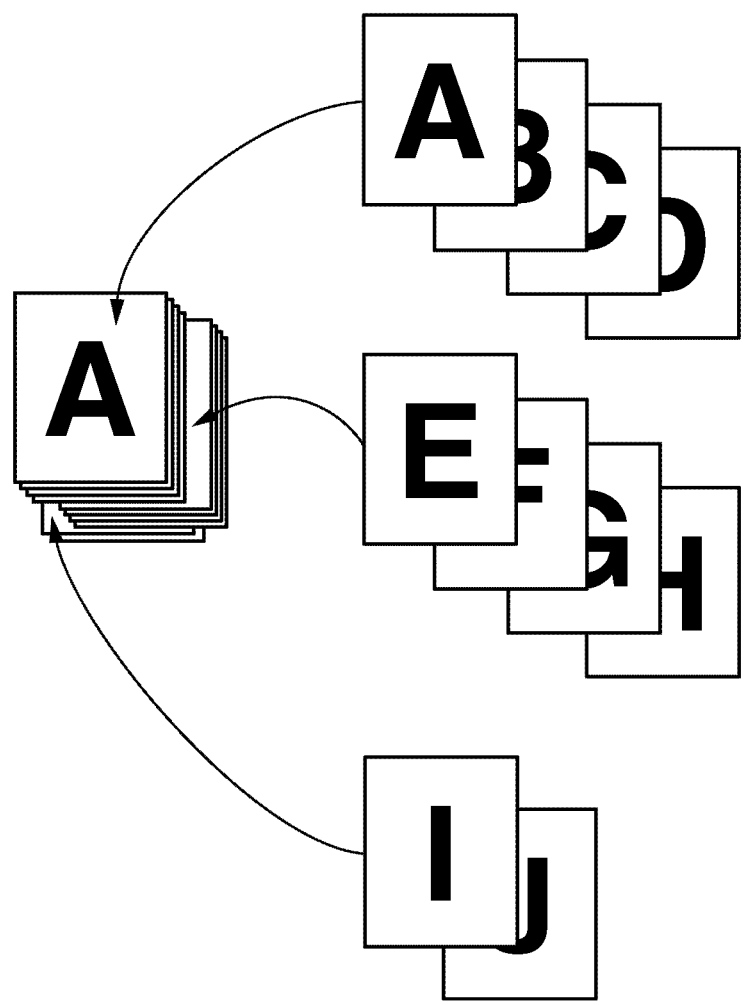
FIG. 13 illustrates a sheet discharge result of sheets to the sheet discharge bin 220-1.

If the document feeder 101 reads the documents illustrated in FIG. 6, to perform the processes in the flowchart illustrated in FIG. 12, a sheet discharge result of sheets to the sheet discharge bin 220-1 is as illustrated in FIG. 13. In FIG. 13, sheets, on which pages A, B, C, D, E, F, G, H, I, and J have been printed in this order, are discharged to the uppermost one of the sheet discharge bins 220-1 with their print surfaces directed downward.

More specifically, the sheets corresponding to the first to fourth pages (A, B, C, and D) and the sheets corresponding to the sixth to ninth pages (E, F, G, and H) illustrated in FIG. 6 are discharged to the same sheet discharge bin 220-1 in the state of being shifted by a predetermined amount. The sheets corresponding to the sixth to ninth pages (E, F, G, and H) and the sheets corresponding to the 11th and 12th pages (I and J) are discharged to the same discharge bin 220-1 in the state of being shifted by a predetermined amount.

Thus, the sheet, on which an image has been printed based on image data corresponding to a page, subsequent to the page that has been determined to be a blank page, which has been determined not to be a blank page, is discharged to be distinguishable from the sheet that has already been discharged.

As described above, according to the third exemplary embodiment, the printing apparatus discharges the sheet, on which the page subsequent to the page that has been determined to be a blank page has been printed, to a position, which is shifted by a predetermined amount from the sheet that has already been discharged to the sheet discharge bin 220-1.

Thus, an operator of the printing apparatus may easily recognize the page that has been determined to be a blank page. When the page that has been determined to be a blank page is printed and is inserted between the sheets that have already been discharged (printed), for example, therefore, the operator may easily recognize a position into which the sheet is to be inserted.

A fourth exemplary embodiment of the present invention will be described below. The fourth exemplary embodiment is a modified example of the first exemplary embodiment, and only a difference from the first exemplary embodiment will be described below. Portions that are not particularly described below are similar to those described in the first exemplary embodiment.

In the first exemplary embodiment, the page that has been determined to be a blank page is not printed, and the processing continues till the last page when the processing is ended.

On the other hand, in the fourth exemplary embodiment, an operator of a printing apparatus is requested to determine whether a page that has been determined to be a blank page is printed, and prints the page that has been requested to print.

Processing performed by the printing apparatus according to the fourth exemplary embodiment will be described with reference to a flowchart illustrated in FIG. 14.

Figure 14:
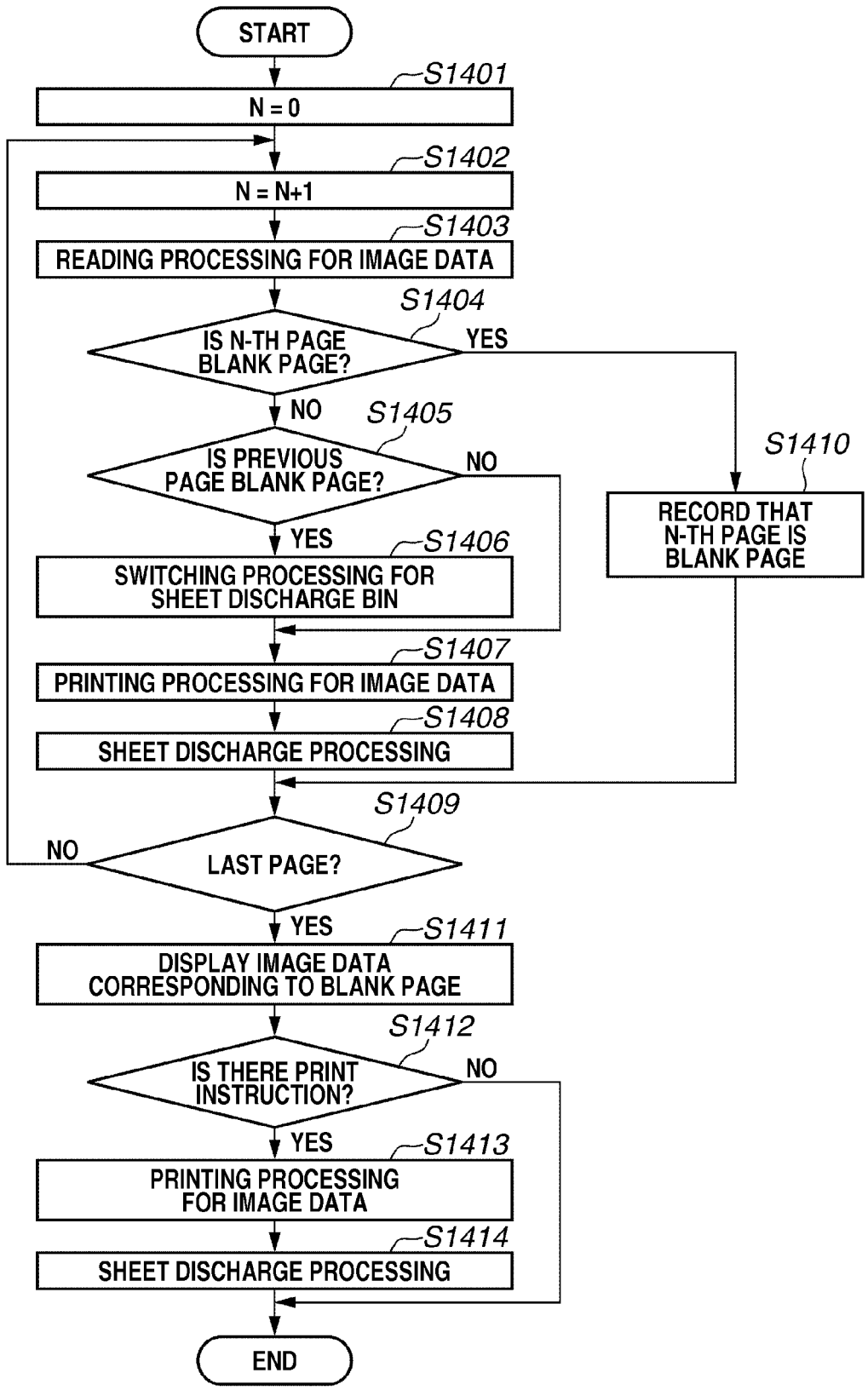
FIG. 14 is a flowchart illustrating processes performed by the printing apparatus.

FIG. 14 is a flowchart illustrating the processing performed by the printing apparatus. Each of operations in the flowchart illustrated in FIG. 14 is performed when a CPU provided in the core unit 10 executes a program. The core unit 10 controls the CONT 1 12 in the reader unit 1 and the CONT 2 14 in the printer unit 2, to perform each of the processes.

The flowchart illustrated in FIG. 14 is a modified example of the flowchart illustrated in FIG. 5 according to the first exemplary embodiment. Operations S1401 to S1410 in the flowchart illustrated in FIG. 14 are similar to operations S501 to S510 in the flowchart illustrated in FIG. 5, and hence description thereof is not repeated.

The fourth exemplary embodiment differs from the first exemplary embodiment illustrated in FIG. 5 in that operations S1411 to S1414 illustrated in FIG. 14 are added, and hence operations S1411 to S1414 will be described below.

In operation S1411, the core unit 10 reads out information representing a page that has been recorded as a blank page in operation S1410 from a RAM provided in the core unit 10. The core unit 10 reads out image data corresponding to the blank page from an image memory unit 9 based on the information representing the page that has been recorded as a blank page, and displays a screen illustrated in FIG. 15 on a display unit 301 provided in the reader unit 1.

Figure 15:
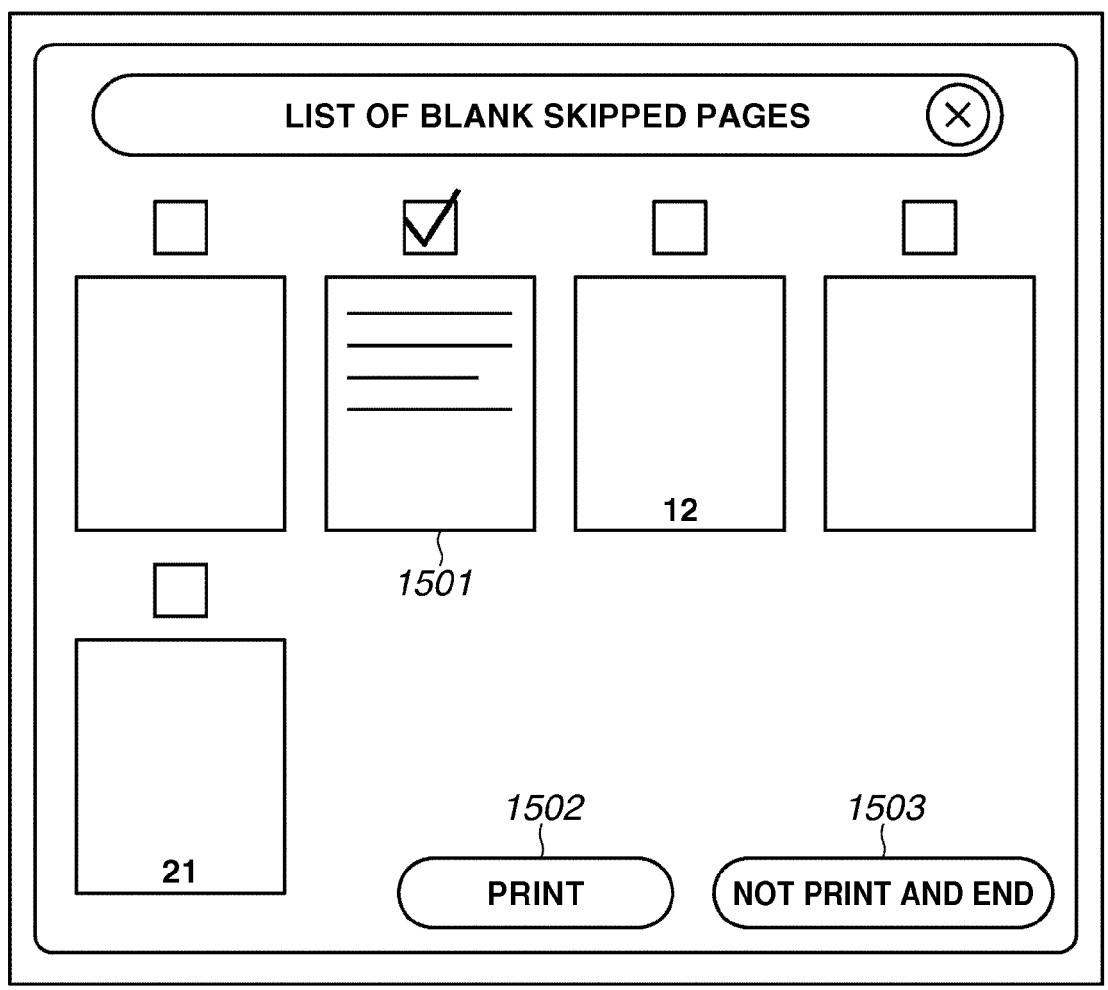
FIG. 15 illustrates a screen displayed on a display unit 301.

The operator of the printing apparatus selects which of pages that have been determined to be blank pages to print via the screen illustrated in FIG. 15 displayed on the display unit 301 by checking a check box.

Thumbnail images obtained by respectively reducing the image data corresponding to the pages that have been determined to be blank pages are displayed on the screen illustrated in FIG. 15. Therefore, the operator of the printing apparatus may select which of the pages to print while visually recognizing the image data corresponding to the pages that have been determined to be blank pages.

If it may be visually recognized that a thumbnail image 1501, for example, includes a character area (a portion indicated by lines), a check box is checked so that image data corresponding to the thumbnail image 1501 is printed.

A button 1502 is pressed after the thumbnail image 1501 is selected by checking the check box, to start to print the image data corresponding to the selected thumbnail image 1501. On the other hand, if no image data is printed, a button 1503 is pressed, to end the processes illustrated in FIG. 14.

In operation S1412, the core unit 10 determines whether an instruction to print the image data corresponding to the thumbnail image selected via the screen illustrated in FIG. 15 is issued in response to pressing (acceptance) of the button 1502 via the screen illustrated in FIG. 15 by the operator.

If it is determined that the print instruction is issued (YES in operation S1412), the processing proceeds to operation S1413. In operation S1413, the core unit 10 reads out the image data corresponding to the thumbnail image selected via the screen illustrated in FIG. 15 from the image memory unit 9, and sends the image data to the printer unit 2, and the CONT 2 14 for the printer unit 2 prints the image data.

In operation S1414, the CONT 2 14 controls a sorter 220, to perform processing for discharging a sheet, on which the printer unit 2 has performed print processing, to a sheet discharge bin 220-1.

While a case where image data read in operation S1405 is not printed a plurality of numbers of times has been described, the embodiments are also applicable to a case where image data is printed a plurality of numbers of times.

For example, the operator sets the number of times image data read in operation S1405 is printed (the number of print copies) via the display unit 301. If two or more times (two or more print copies) are set as the number of times the image data is printed, the core unit 10 performs processes in operations S1411 and S1412 illustrated in FIG. 14 for the first print processing (the first print copy).

In this case, the processes in operations S1411 and S1412 illustrated in FIG. 14 are not performed for the second and subsequent print processing (the second and subsequent print copies). The core unit 10 performs control so that the page that has been instructed to print via the screen illustrated in FIG. 15 for the first print processing is printed in the second and subsequent print processing. Thus, the processes in operations S1411 and S1412 illustrated in FIG. 14 are not performed a plurality of numbers of times if the same image data is printed a plurality of numbers of times.

As described above, according to the fourth exemplary embodiment, the operator of the printing apparatus may easily determine whether the printing apparatus issues an instruction to print the page that has been determined to be a blank page.

One disclosed aspect of the embodiments may also be implemented by performing processing for supplying software (a program) for implementing the functions of the above-described exemplary embodiments to a system or an apparatus via a network or various types of storage media and reading out and executing the program using a computer (or a CPU or a microprocessor unit (MPU)) in the system or the apparatus. In this case, the program and a storage medium storing the program constitute one of the embodiments.

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a document editing apparatus, a document). In addition, the operations in the method transform the elements or parts from one state to another state. The transformation is particularized and focused on document editing. The transformation provides a different function or use such as extracting a layout variable, adjusting a value of the layout variable, displaying the document, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-002165 filed Jan. 7, 2011, which is hereby incorporated by reference herein in its entirety.

What is claimed is:

1. A printing apparatus comprising:
an input unit configured to input image data;
a printing unit configured to perform print processing on a sheet based on the image data input by the input unit;
a determination unit configured to determine whether the image data input by the input unit is image data indicating a blank page;
a control unit configured to, in a case where the determination unit determines that the image data is not image data indicating a blank page, control the printing unit to perform print processing based on the image data, and in a case where the determination unit determines that the image data is image data indicating a blank page, control the printing unit not to perform print processing based on the image data; and
a sheet discharge unit configured to discharge a sheet on which the print processing is performed by the printing unit,
wherein, in a case where the input unit inputs image data in order of first image data, second image data, and third image data, and the first image data and the third image data are not image data indicating a blank page, and the second image data is image data indicating a blank page, the sheet discharge unit discharges a sheet on which the print processing is performed based on the first image data on a first sheet stacking unit and discharges a sheet on which the print processing is performed based on the third image data on a second sheet stacking unit which is different from the first sheet stacking unit.

2. The printing apparatus according to claim 1, wherein the determination unit determines whether image data input by the input unit is image data indicating a blank page based on a number of black pixels included in the image data input by the input unit.

3. The printing apparatus according to claim 1, further comprising
a display unit configured to display image data determined by the determination unit as image data indicating a blank page; and
a receiving unit configured to receive a print instruction of the image data displayed by the display unit,
wherein the printing unit performs print processing based on the image data that has been received the print instruction.

4. The printing apparatus according to claim 1, wherein the input unit inputs image data generated by reading a document.

5. A printing method comprising:
inputting image data by using an input unit;
performing print processing by using a printing unit on a sheet based on the image data;
determining whether the image data input by the input unit is image data indicating a blank page;
controlling the printing unit, in a case where the image data is determined not to be image data indicating a blank page, to perform print processing based on the image, data, and, in a case where the image data is determined to be image data indicating a blank page, controlling the printing unit not to perform print processing based on the image data; and
discharging a sheet, on which the print processing is performed, wherein, in a case where the input unit inputs image data in order of first image data, second image data, and third image data, and the first image data and the third image data are not image data indicating a blank page, and the second image data is image data indicating a blank page, discharging comprises discharging a sheet on which the print processing is performed based on the first image data on a first sheet stacking unit and discharging a sheet on which the print processing is performed based on the third image data on a second sheet stacking unit which is different from the first sheet stacking unit.

6. A non-transitory computer-readable storage medium storing a program that, when executed by a computer, cause the computer to perform operations comprising:
   inputting image data;
   performing print processing on a sheet based on the image data;
   determining whether the image data is image data indicating a blank page;
   controlling, in a case where the image data is determined not to be image data indicating a blank page, performing print processing based on the image data, and, in a case where the image data is determined to be image data indicating a blank page, controlling not performing print processing based on the image data; and
   discharging a sheet, on which the print processing is performed,
   wherein, in a case where the input image data is input in order of first image data, second image data, and third image data, and the first image data and the third image data are not image data indicating a blank page, and the second image data is image data indicating a blank page, discharging comprises discharging a sheet on which the print processing is performed based on the first image data on a first sheet stacking unit and discharging a sheet on which the print processing is performed based on the third image data on a second sheet stacking unit which is different from the first sheet stacking unit.

* * * * *